United States Patent [19]

Nemoto

[11] Patent Number: 4,656,884

[45] Date of Patent: Apr. 14, 1987

[54] POWER TRANSMISSION MECHANISM

[75] Inventor: Isao Nemoto, Narashino, Japan

[73] Assignee: Nemoto Kikaku Kogyo Co., Ltd., Chiba, Japan

[21] Appl. No.: 709,312

[22] Filed: Mar. 7, 1985

[30] Foreign Application Priority Data

Mar. 9, 1984 [JP] Japan .................................. 59-45249
Mar. 24, 1984 [JP] Japan .................................. 59-57088

[51] Int. Cl.<sup>4</sup> .............................................. F16H 1/18
[52] U.S. Cl. .................................. 74/424.5; 74/424.7; 74/458
[58] Field of Search .................... 74/424.7, 424.5, 425, 74/458, 457, 216.3; 701/410

[56] References Cited

U.S. PATENT DOCUMENTS

| | | | |
|---|---|---|---|
| 506,409 | 10/1893 | Wellman | 74/458 |
| 896,691 | 8/1908 | Collier | 74/458 |
| 1,273,556 | 7/1918 | Warriner | 74/410 |
| 1,359,853 | 1/1920 | Wilkinson | 74/410 |
| 1,383,706 | 7/1921 | Farnum | 74/410 |
| 2,451,998 | 10/1948 | Wahlberg et al. | 74/458 |
| 2,455,487 | 12/1948 | Hoffar | 74/458 |
| 2,664,760 | 1/1954 | Booth | 74/458 |
| 2,673,473 | 3/1954 | Phelps | 74/458 |
| 3,365,974 | 1/1968 | Lieberman | 74/458 |
| 3,481,215 | 12/1969 | Howell | 74/424.5 |
| 3,494,215 | 2/1970 | Fengler | 74/458 |
| 3,752,000 | 8/1973 | Roberts | 74/216.3 |
| 3,776,060 | 12/1973 | Pessen | 74/424.7 |
| 3,969,956 | 7/1976 | Hanslik | 74/424.7 |

Primary Examiner—Leslie Braun
Assistant Examiner—Joseph M. Rolnicki
Attorney, Agent, or Firm—Young & Thompson

[57] ABSTRACT

A power transmission mechanism in which a small rotatable screw thread is arranged symmetrically with a large rotatable screw thread. The pitch and the pitch circle diameter of the large screw thread are the same integer times the pitch and the pitch circle diameter of the small screw thread. The screw thread grooves are connected through ball means and a convenient combination of screw threads provides an input shaft and an output shaft either in parallel or in alignment. This arrangement provides a power transmission mechanism of a compact size and a simple structure with an enhanced ratio of power increase and decrease.

8 Claims, 9 Drawing Figures

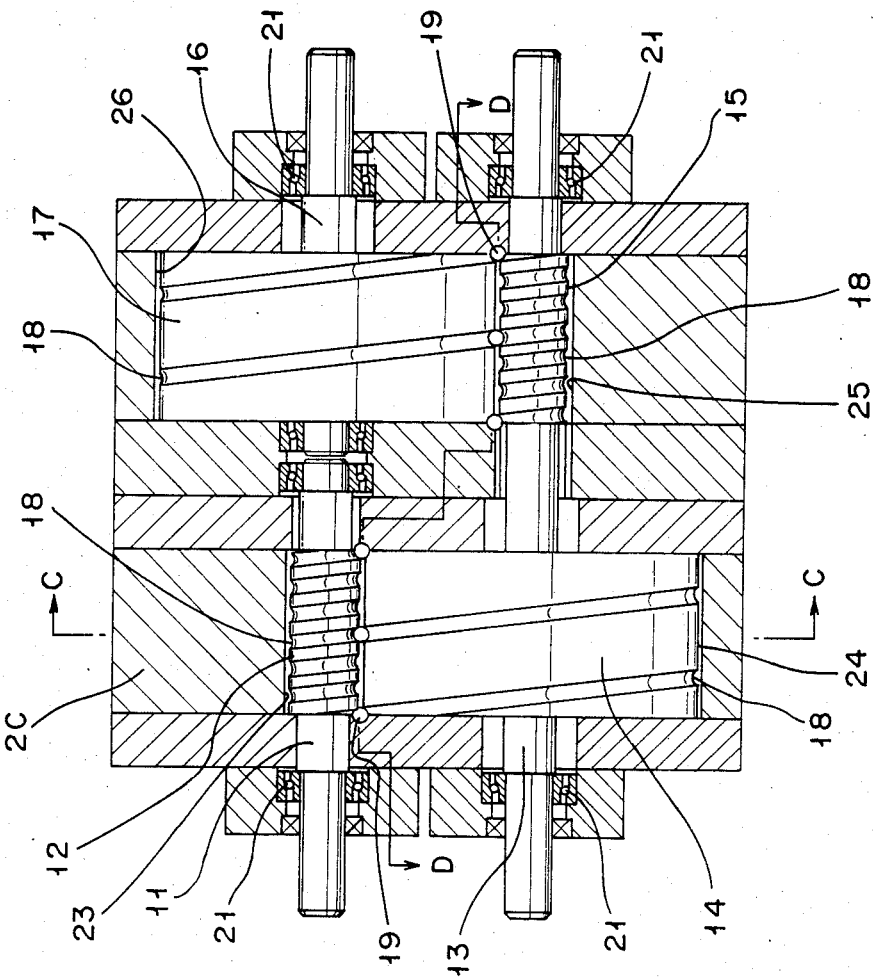

POWER TRANSMISSION MECHANISM

BACKGROUND OF THE INVENTION

There have been proposed various types of power transmission mechanisms applying many types of gears such as a planetary gear system, a bevel gear system, a worm with worm wheel system and the like. These conventional mechanisms, however, have generally complicated structures and need to make use of gears which increases the cost of manufacturing. Further, the complicated structure increases the size of the mechanism which also increases the cost, and the cost of the mechanism is a large part of the cost of the entire machine into which it is incorporated.

Moreover, in mechanisms which make use of the bevel gear system or the worm with worm wheel system, an axis of the input shaft is crossed with an axis of the output shaft at either right angles or at some other predetermined angle. The crossing of the shafts increases the difficulty of designing the machine to be compact. Accordingly, it has been desired to provide a compact power transmission mechanism which has an enhanced power increase and decrease ratio such that an axis of the input shaft and an axis of the output shaft are arranged in parallel or in alignment.

SUMMARY OF THE INVENTION

It is, therefore, a principle of the object of the invention to provide at reduced cost a compact power transmission mechanism which has an elevated increase and decrease ratio in which an axis of the input shaft and an axis of the output shaft are arranged in alignment or in parallel to achieve a positive power transmission without entailing any backlash effect.

For the foregoing purpose, the invention provides a power transmission mechanism comprising a predetermined number of first rotary shafts arranged on a first common axis and a predetermined number of second rotary shafts arranged on a second common axis which is located in parallel to the first common axis. The first and second rotary shafts are provided on their peripheries respectively with a small screw thread and a large screw thread which are arranged symmetrically. The pitch and the pitch circle diameter of the large screw thread are the same integer times the pitch and the pitch circle diameter of the small screw thread respectively, the distance between the parallel axes is determined so that the screw thread grooves of the small and large screw threads through ball means which are continuously supplied into a space formed by the confronted small and large screws thread grooves.

The preferred embodiments of the invention will be described in detail with reference to the accompanying drawings.

BRIEF DESCRIPTION THE DRAWINGS

FIG. 5 is a sectional front elevation of the power transmission mechanism according to the invention;

PREFERRED EMBODIMENTS OF THE INVENTION

Figure 1:
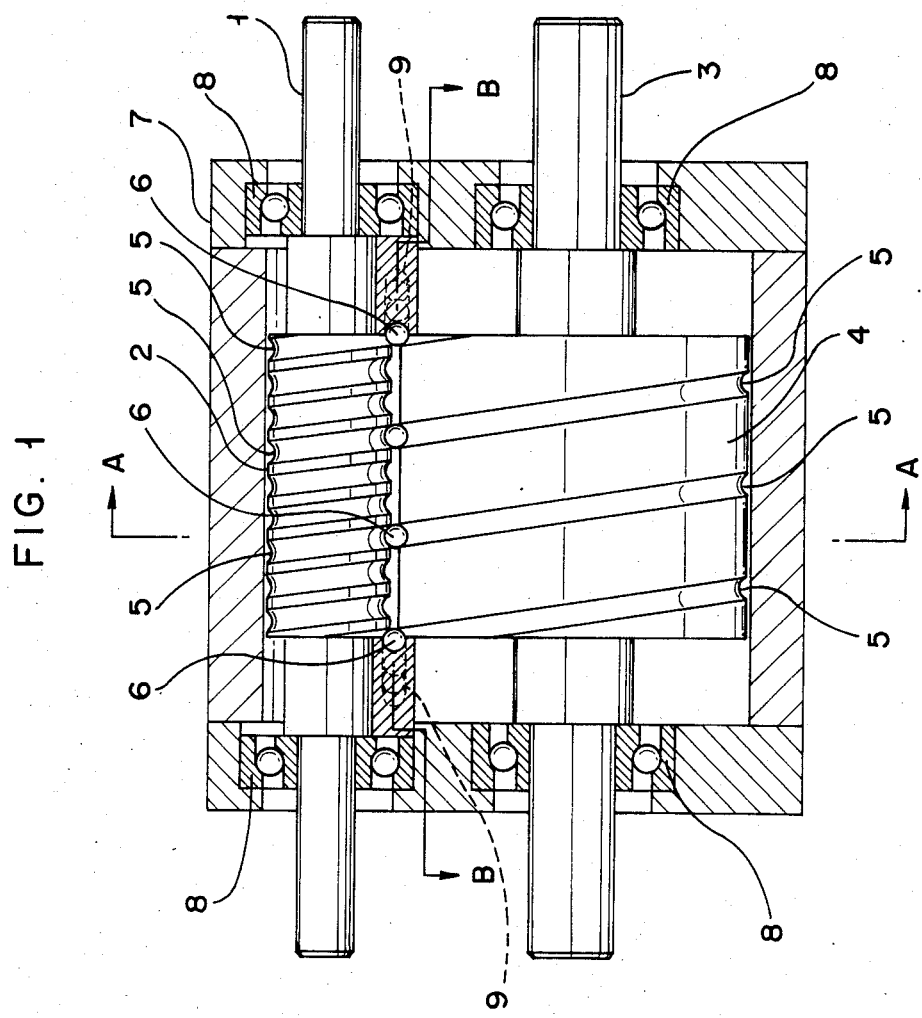
FIG. 1 is a partially sectioned front elevation of the power transmission mechanism according to the invention.

In the accompanying drawings of FIGS. 1 to 4, the reference numeral 1 indicates a first rotary shaft which is provided at its periphery with a first screw thread 2 with a pitch P1 and a pitch circle diameter D1. The reference numeral 3 represents a second rotary shaft which is provided at its periphery with a second screw thread 4 with a pitch nP1 (n denotes an integer) and a pitch circle diameter nD1. n is the same integer in both cases.

The first rotary shaft 1 and the second rotary shaft 3 are arranged in parallel such that one shaft is above the other. Further, the distance between the first rotary shaft 1 and the second rotary shaft 3 is so determined that the screw thread groove 5 of the first screw thread 2 is opposite the screw thread groove 5 of the second screw thread 4 at every distance n times the pitch so that the balls 6 fit snugly in the space between the grooves 5. The first and the second rotary shafts 1 and 3 are rotatably supported in a support body 7 by means of bearings 8.

Figure 4:
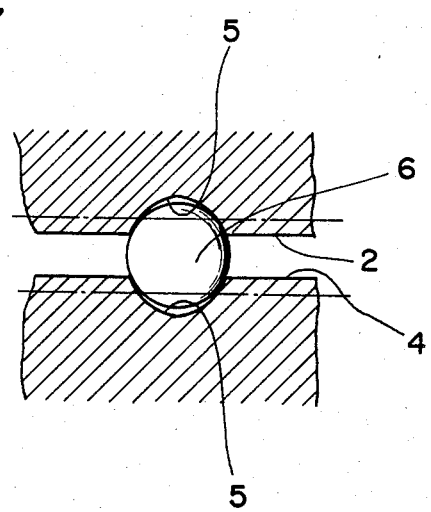
FIG. 4 is a fragmentarily enlarged sectional view showing the positions of the confronted screw thread grooves.
Figure 3:
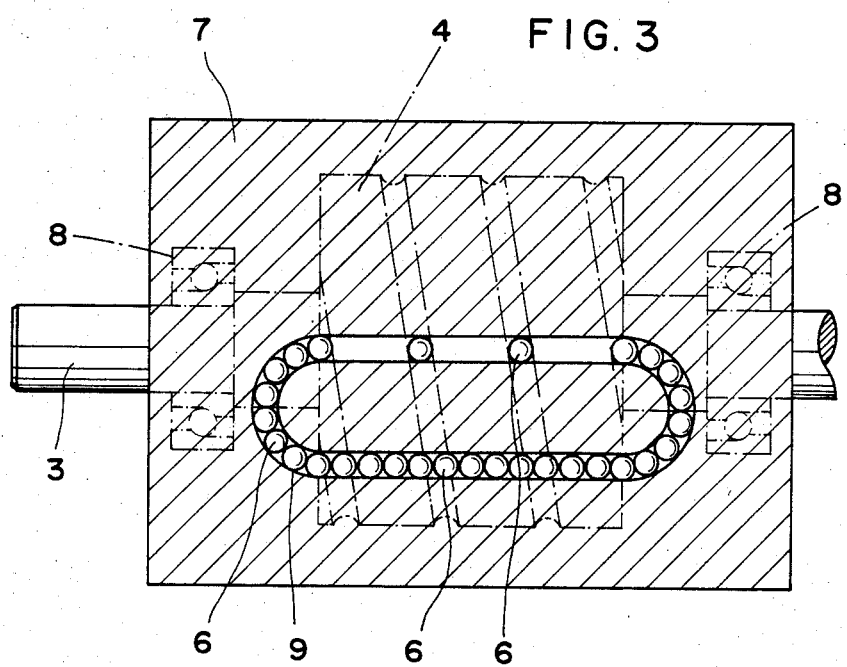
FIG. 3 is a sectional view taken along the line B—B of FIG. 1.

As particularly illustrated in FIG. 4, the shape of the screw thread groove 5 is configured such that its size is somewhat greater than the diameter of the ball 6 which is to be received in the space formed between the confronted screw thread grooves 5. A wedge shaped empty space remains at each bottom of the screw thread groove 5.

Moreover, the first rotary shaft 1 and the second rotary shaft 3 are arranged in such a way that the ball 6 is positioned on a tangential line between the first screw thread 2 and the second screw thread 4.

Figure 2:
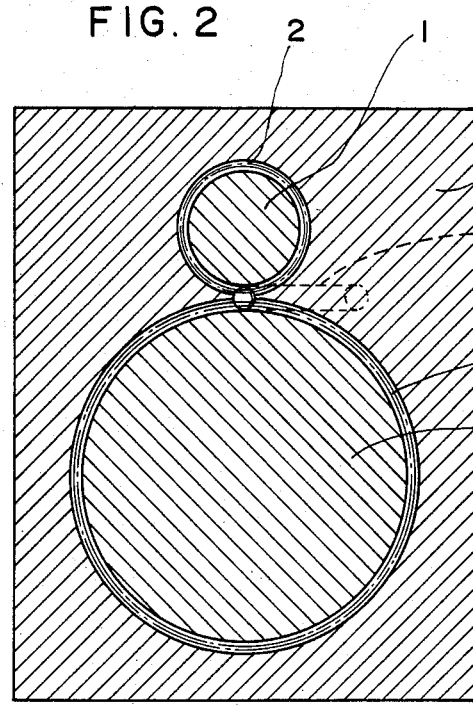
FIG. 2 is a cross sectional view taken along the line A—A of FIG. 1.

As shown in FIG. 2, in order to prevent the ball 6 from falling off the tangential line the rotary support 7 is internally constructed such that the first rotary shaft 1 and the second rotary shaft 3 are rotatably supported therein and between the first rotary shaft 1 and the second rotary shaft 3 is formed a space in the plane of the figure and perpendicular to the axes of the first and second rotary shafts 1 and 3 with a width sufficient enough to pass the ball 6 therethrough so that the ball 6 is moved only along the tangential line.

The ball 6 is moved sequentially along the space by the rotation of the confronted screw thread grooves 5 of the first rotary shaft 1 and the second rotary shaft 3. Thus, the ball 6 must be supplied to the positions where the screw thread grooves 5 are sequentially confronted to one another. For this purpose, in accordance with movements of the screw thread grooves 5 the ball 6 is circulated to the positions of the sequentially confronting screw thread grooves 5.

As the first rotary shaft 1 and the second rotary shaft 3 are arranged in an upper and lower relation as hereinbefore described, a groove 9 for circulating the balls 6 is formed horizontally into an elliptical shape in which the balls 6 are moved. When the balls are positioned between the screw threads, they are kept apart by a distance equal to a predetermined pitch. At other places in the circulation groove, the balls are moved in a continuous row with no spacing.

Accordingly, when the first rotary shaft 1 is turned as an input shaft for one revolution the ball 6 is moved for only 1/n pitch of the screw thread groove 5 of the second rotary shaft 3, while the second rotary shaft also rotates that fraction, because the first rotary shaft 1 and the second rotary shaft 3 have respective screw threads 2 and 4 with pitches P1 and nP1. The screw thread groove 5 of the second rotary shaft 3 is confronted with the groove 5 of the first rotary shaft 1 at every n loop of the screw thread 2. Specifically, for one revolution of the first rotary shaft 1 the second rotary shaft 3 goes through to 1/n revolution. However, if the first rotary shaft 1 is provided as an output shaft whereas the second rotary shaft 3 operates as an input shaft, an output power of shaft 1 of n times the revolution of shaft 3 is obtained, in the present example. Further, with respect to the pitch and the pitch circle diameter, the second rotary shaft 3 is powered up to n time the first rotary shaft 1, so that the lead angles of the screw thread grooves 5 are substantially identical. Thus, the ball 6 receives no resistance at the lead angle, which removes the slipping effect of the ball 6 and ensures a positive power increase and decrease ratio.

In another embodiment as illustrated in FIGS. 5 to 9, the reference numeral 11 represents a first rotary shaft having at its periphery a first small screw thread 12 with a pitch P2 and a pitch circle diameter D2. The, the reference numeral 13 indicates a second rotary shaft having at its periphery a first large screw thread 14 with a pitch nP2 (n denotes an integer) and a pitch circle diameter nD2 where n is the same integer. Rotary shaft 13 also has a second small screw thread 15 of the same pitch P2 and pitch circle diameter D2 as those of the first small screw thread 12. Further, the reference numeral 16 represents a third rotary shaft which at its periphery is provided with a second large screw thread 17 of the same pitch nP2 and pitch circle diameter nD2 as those of the first large screw thread 14.

The first rotary shaft 11 and the second rotary shaft 13 are arranged in parallel with shaft 11 above shaft 13 so that the first small screw thread 12 and the first large screw thread 14 confront each other. In this arrangement, a screw thread groove 18 of thread 12 is opposite groove 18 of the first large screw thread 14 at every n times the pitch (where pitch is defined as a distance between successive loops of the groove) of the first small screw thread 12. The distance between the first rotary shaft 11 and the second rotary shaft 13 is determined so that the confronted screw thread grooves 18 are made to contact each other through the ball 19. The first rotary shaft 11 and the second rotary shaft 13 are rotatably supported in a case body 20 through bearings 21.

The second rotary shaft 13 and the third rotary shaft 16 are arranged in parallel with shaft 11 above shaft 13 while the third rotary shaft 16 in aligned with the first rotary shaft 11, so that the second small screw thread 15 of the second rotary shaft 13 is confronted with the second large screw thread 17 of the third rotary shaft 16. In this arrangement, the screws thread groove 18 of thread 15 is the opposite groove 18 of second large screw thread 17 n times the pitch of the second small screw thread 15. The distance between the second rotary shaft 13 and the third rotary shaft 16 is determined so that the screw thread grooves 18 are made to contact each other through the ball 19. The second rotary shaft 13 and the third rotary shaft 16 are rotatably supported in the case body 20 through the bearings 21. The screw thread grooves 18 of the first small screw thread 12 and the first large screw thread 14 are formed into such a shape that the balls 19 are made to contact the screw thread grooves 18 at their two opposite points. The same is true of the second small screw thread 15 and the second long screw thread 17.

Figure 7:
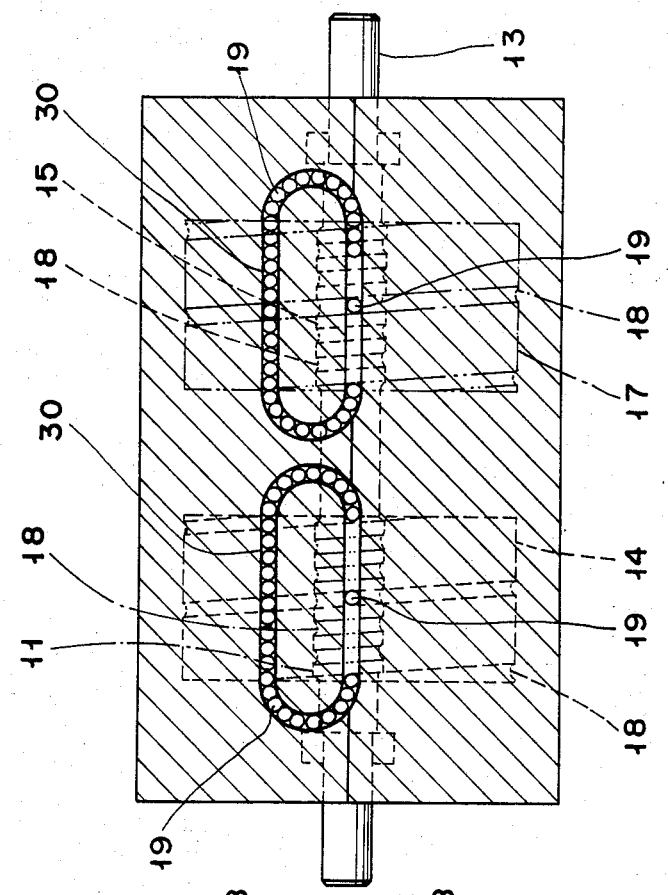
FIG. 7 is a sectional view taken along the line D—D of FIG. 5.
Figure 6:
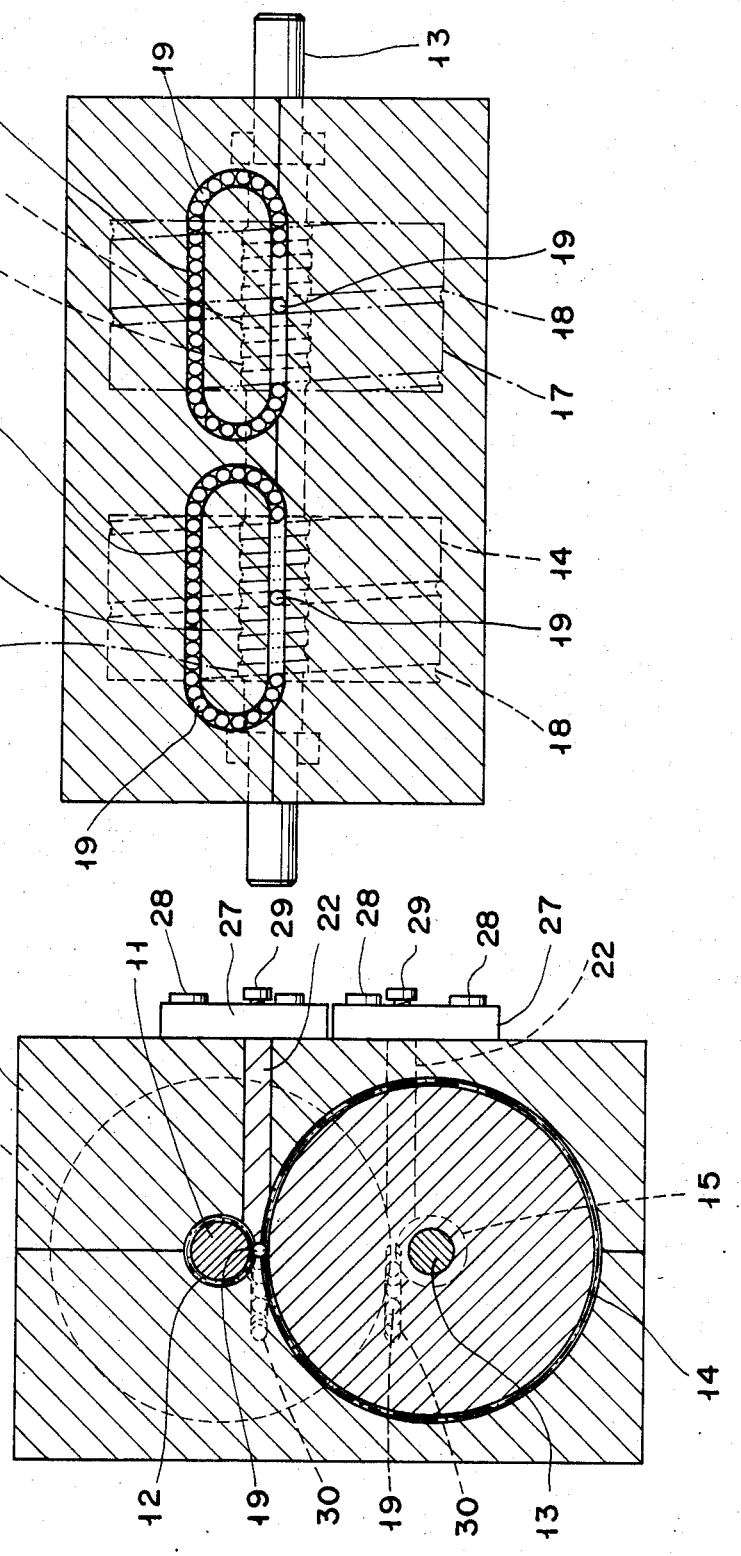
FIG. 6 is a cross sectional view taken along the line C—C of FIG. 5.

The balls 19 are moved in accordance with the sequential displacements of the positions of the confronted screw thread grooves 18 when the rotary shafts 11, 13 and 16 are turned. Thus, the balls 19 must be supplied to the positions of the sequentially confronting screw thread grooves 18. For this purpose, the balls 19 moved in accordance with displacements of the screw thread grooves 18 are circulated for supply into the position of the screw thread grooves 18 which are again confronted sequentially. Further, since the rotary shafts 11, 13 and 16 are arranged above and below each other, the grooves 30 for circulating the balls 19 are horizontally formed into elliptical shapes and positioned between the first rotary shaft 11 and the second rotary shaft 13 as well as between the second rotary shaft 13 and the third rotary shaft 16 as illustrated in FIGS. 6 and 7.

The distance between the adjacent balls 19 when they are positioned between the confronted screw thread grooves 18 is determined such that the balls are moved but keep a distance equal to the pitch of the large screw thread grooves 18 between them. The balls are moved in a row in the other part of the circulation groove 30.

As hereinbefore described, the rotary shafts 11, 13 and 16 are arranged so that the balls 19 are positioned on the tangential line formed between the first small screw thread 12 and the first large screw thread 14 and also on the tangential line formed between the second small screw thread 15 and the second large screw thread 17.

Figure 9:
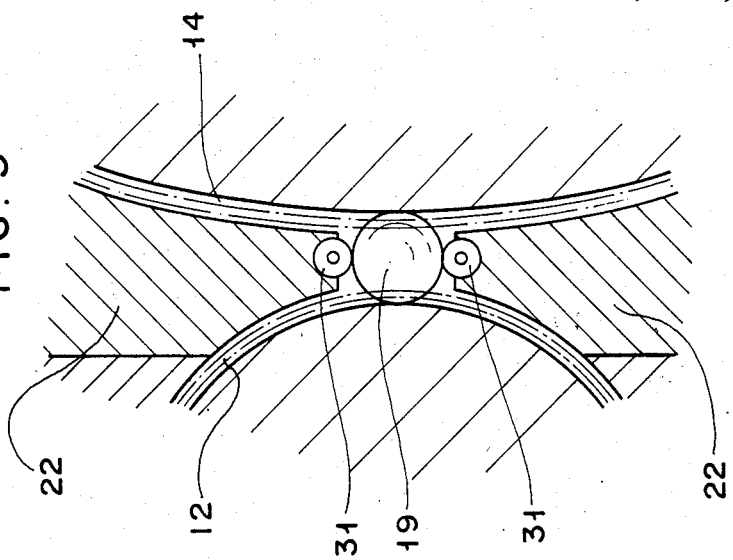
FIG. 9 is a fragmentarily enlarged sectional view of an essential part of FIG. 8.
Figure 8:
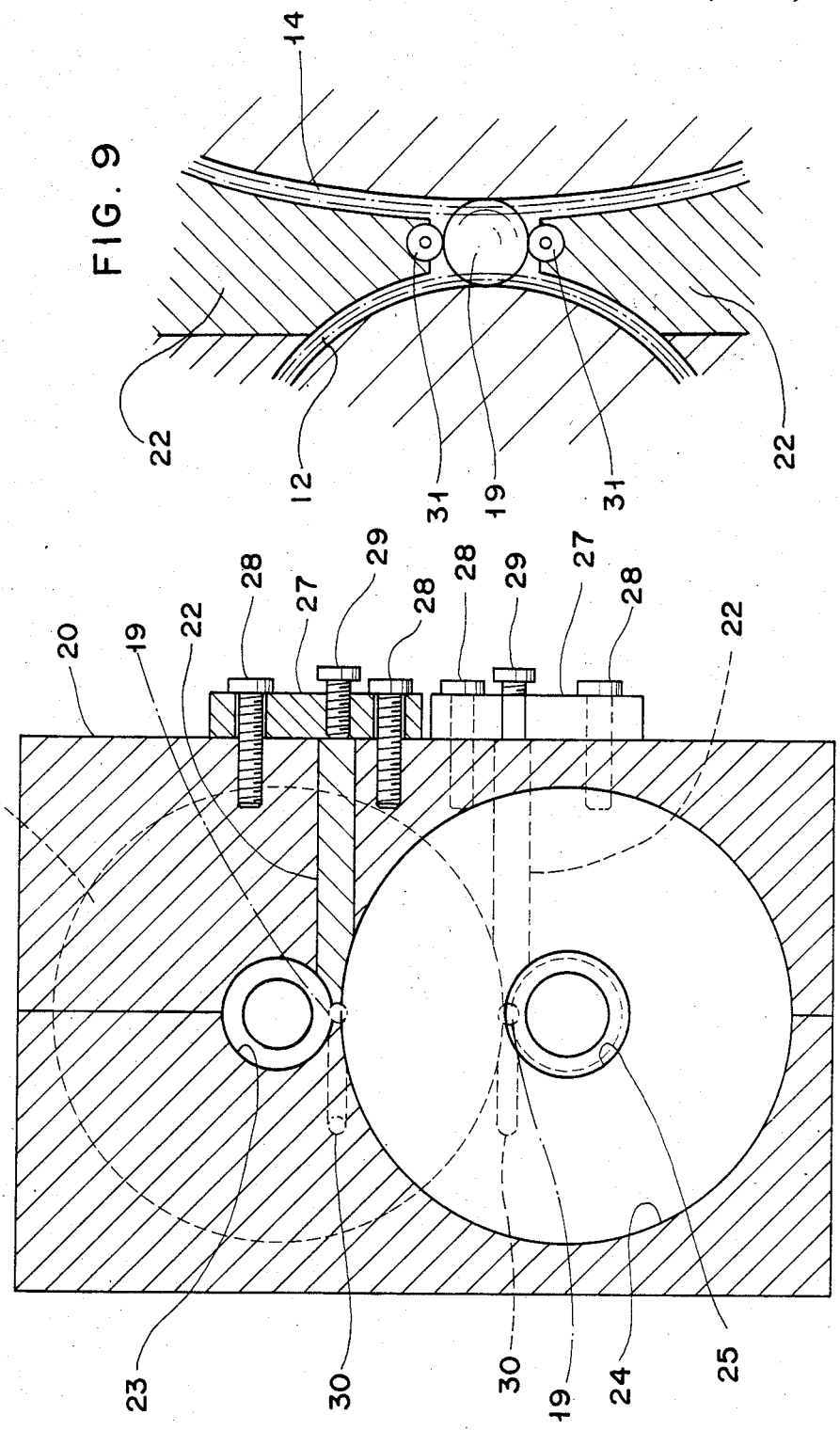
FIG. 8 is a fragmentarily enlarged sectional view of the case body.

In the case body 20, between the first small screw thread receiving chamber 23 and the first large screw thread receiving chamber 24 as well as between the second small screw thread receiving chamber 25 and the second large screw thread receiving chamber 26, there is provided a horizontally movable ball position regulating plate 22 adapted to embrace the ball 19 from a lateral position opposite to the circulation groove 30. This ball position regulating plate 22 is formed into a thickness to be conveniently insertable from the lateral direction. An extremity of the plate is formed into a substantially wedged configuration by cutting it according to the curvatures of the receiving chambers 23, 24, 25 and 26 (FIG. 9).

In the case body 20, an adjusting base plate 27 is fixed by means of a screw 28 and an adjusting screw 29 is threaded into the base plate 27 so that an extremity of the adjusting screw 29 is made to contact the end of the ball position regulating plate 22 or is threaded thereinto (not shown). Upon turning the adjusting screw 29, the ball position regulating plate 22 is urged against the ball 19 or retructed therefrom for holding the ball 19 in the predetermined position.

The ball position regulating plate 22 may also be formed in such a way that it may be moved against or retructed from the ball 19.

Further, the shape of the extremity of the ball position regulating plate 22 is not restricted to the configuration as described in the foregoing but it may be designed such that a rotary body such as a roller 31 is located at the extermity of the plate 22 so that the ball 19 even when urged by the extremity of the ball position regulating plate 22 is conveniently revolved for achieving a smooth power transmission effect without however entailing any back-lash effect.

When the pitches and the pitch circle diameters of the first large screw thread 14 and the second large screw thread 17 are provided as six times as those of the first small screw thread 12 and the second small screw thread 15, (i.e. n=6) and the first rotary shaft 11 is turned as an input shaft, the relationship between the confronted thread screw grooves 18 of the first rotary shaft 11 and the second rotary shaft 13 provides a pitch ratio of 1:6 so that one revolution of the first rotary shaft 11 makes only 1/6 revolution of the second rotary shaft 13. The relationship between the confronted screw thread grooves 18 of screw thread 15 of the second rotary shaft 13 and the grooves of the thread 17 of third rotary shaft 16 also has a pitch ratio of 1:6, so that one revolution of the second rotary shaft 13 provides similarly only a 1/6 revolution of the third rotary shaft 16. Accordingly, when the first rotary shaft as an input shaft 11 is turned for one revolution the third rotary shaft 16 acting as an output shaft provides 1/6×1/6 revolution, i.e. with a power reduction of 1/36 revolution. Further, when the third rotary shaft 16 is provided as an input shaft, the first rotary shaft 11 acting as an output shaft is powered up to 36 times revolution. While, when the second rotary shaft 13 is provided as an input shaft, the first rotary shaft 11 is powered up to six times revolution with reduction of the power of third rotary shaft 16 to 1/6 revolution.

Moreover, when either the first rotary shaft 11 or the third rotary shaft 16 is provided as an input shaft, the other of the two shafts is positioned in alignment to provide an input shaft of the highest power increase (shaft 11) decrease (shaft 16) ratio. Further, when the first rotary shaft 11 acts as an input shaft, reduction ratios of 1/6 at the second rotary shaft 13 and 1/36 at the third rotary shaft 16 may be obtained, while when the third rotary shaft 16 acts as an input shaft, the outputs of increased power ratios are 6 times and 36 times at shafts 13 and 11 respectively.

Even with such high power increase and decrease ratios of 1/36 and 36, the diameters of the first large screw thread 14 and the second large screw thread 17 in relation to the first small screw thread 12 and the second small screw thread 15 may be provided to be only four times to provide a compact arrangement. The ratio between the pitch and pitch circle diameter of the first large screw thread 14 and the second large screw thread 17 with respect to the first small screw thread 12 and the second small screw thread 15 are provided as an integer n so that the lead angles of the screw thread grooves become substantially identical. There is negligible regisitance against the balls 19 at the lead angle and also no slipping of the ball 19, which provides a positive power increase or decrease ratio.

If the input shaft is not needed to be arranged in alignment with the output shaft, the arrangements of the rotary shafts 11, 13 and 16 may selectively be changed with convenient determinations of the diameters of the screw threads 12, 14, 15 and 17.

Although the invention has been described with reference to application of three rotary shafts, multiple stages of the rotary shafts may also be used in order to obtain a greater power increase and decrease ratio.

As hereinbefore fully described, the power transmission mechanism according to the invention may be provided at a reduced cost and with enhanced power increase and decrease ratio in a compact size but without entailing any back-lash effect for providing a positive power transmission effect.

The arrangement of the mechanism according to the invention provides a reduction of the power of multiple times or an increase of the power of multiple times and this effect may be obtained with a pitch circle diameter ratio of a multiple times to provide a compact arrangement of the large screw thread. Further, since the lead angles are made to be identical to each other no resistance against the balls 6 and 19 occurs at the lead angle. There is no slipping effect and a positive power increase and decrease ratio. Moreover, since the rotary shafts are arranged on a parallel axes so that the small screw thread confronts the large screw thread the power may be transmitted alternately along two axes. An even number of rotary shafts requires that the input shaft and the output shaft be in parallel, while an odd number of rotary shafts allows the input shaft and the output shaft to be in alignment so that it is convenient to incorporate the mechanism into the machine. Thus, the invention allows for the simplification of the whole machine. By the convenient combinations of the small screw thread with the large screw thread, a fractional power reduction ratio or a multiple power increase ratio may be obtained which corresponds to the number of shafts and the ratio n. Moreover, in the arrangement according to the invention, the power increase and decrease ratio may be obtained by applying the screw thread grooves 5 and 18 but without applying any gear or the like, so that the mechanism may be manufactured without necessitating any gear cutting process which allows manufacture of the mechanism at a reduced cost.

Further, in the mechanism according to the invention, the balls 6 and 19 may be continuously supplied into the position where the confronting screw threads are made to contact each other, so that a continuous power increase and decrease ratio may smoothly be obtained. When the screw threads are made to contact each other through the balls 6 and 19, the balls may be conveniently rolled free of clearance between the contacting positions of the screw threads without entailing any backlash for a positive power increase and decrease ratio because the contacting directions of the screw threads are different from the rolling directions of the ball 6 and 19.

Although the preferred embodiments of the invention have been described hereinabove, the invention may be varied and modified in many ways without departing from the scope and the spirit of the invention.

What is claimed is:

1. A power transmission mechanism comprising: a predetermined number of first rotary shafts arranged on a first common axis, said rotary shafts each having on its periphery a small screw thread; a predetermined number of second rotary shafts arranged on a second common axis such that said second common axis is parallel to said first common axis, said second rotary shafts each having on its periphery a large screw thread; a plurality of ball means; wherein a pitch and a pitch circle diameter of the large screw threads is equal to an integer multiple of the pitch and pitch circle diameter of the small screw threads, the large screw threads and the small screw threads are arranged symmetrically so that there is a space therebetween, and wherein said balls are circularly and successively supplied into said space and contact both said large screw threads and said small screw threads so that when one of said shafts is rotated, the other of said shafts is rotated in the same direction.

2. A power transmission mechanism as claimed in claim 1, wherein said predetermined number of first rotary shafts is one and said predetermined number of second rotary shafts is one such that a first single rotary shaft is arranged on one axis and a second single rotary shaft is arranged on a parallel axis, said first rotary shaft having at its periphery a small screw thread and said second rotary shaft having at its periphery a large screw thread.

3. A power transmission mechanism comprising: two first rotary shafts which are arranged on a first axis; one second rotary shaft which is arranged on a second parallel axis, such that one of said first rotary shafts has at its periphery a small screw thread and the other of said two first rotary shafts has at its periphery a large screw thread and said single second rotary shaft has at its periphery a large screw thread on one end and a small screw thread on the other end; and a plurality of ball means; wherein a pitch and a pitch circle diameter of the large screw threads is equal to an integer multiple of the pitch and pitch circle diameter of the small screw threads, the large screw threads and the small screw threads are arranged symmetrically so that there is a space therebetween, and wherein said balls are circularly and successively supplied into said space and contact both said large screw threads and said small screw threads so that when one of said shafts is rotated, the others of said shafts are rotated in the same direction.

4. A power transmission mechanism as claimed in claim 3, wherein, the one of said first rotary shafts with a small screw thread is opposite the end of said second rotary shaft with said large screw thread, and said one of said first rotary shafts with said large screw thread is opposite said end of said second rotary shafts with said small screw thread, such that between each opposing combination of a small screw thread and a large screw thread there is a space where the balls are circularly and successively supplied.

5. A power transmission mechanism as claimed in claim 1, wherein the balls to be supplied are positioned on a tangential line between a large screw thread and a small screw thread.

6. A power transmission mechanism as claimed in claim 5, further comprising a position regulating plate for holding the balls in a predetermined position between a large screw thread and a small screw thread.

7. A power transmission mechanism as claimed in claim 1, wherein said integer is equal to 6, so that one complete revolution of a first rotary shaft causes a 1/6 revolution of a second rotary shaft.

8. A power transmission mechanism as claimed in claim 3, wherein said integer is equal to 6 such that a power increase or decrease of 36 times is obtained.

* * * * *